US007171409B2

(12) United States Patent
Craig et al.

(10) Patent No.: US 7,171,409 B2
(45) Date of Patent: Jan. 30, 2007

(54) COMPUTERIZED INFORMATION SEARCH AND INDEXING METHOD, SOFTWARE AND DEVICE

(75) Inventors: James William Craig, Waterloo (CA); Jonathan Gordon Durward, Waterloo (CA)

(73) Assignee: Comtext Systems Inc., Kitchener (CA)

( * ) Notice: Subject to any disclaimer, the term of this patent is extended or adjusted under 35 U.S.C. 154(b) by 548 days.

(21) Appl. No.: 10/059,345

(22) Filed: Jan. 31, 2002

(65) Prior Publication Data

US 2003/0145001 A1 Jul. 31, 2003

(51) Int. Cl.
*G06F 17/30* (2006.01)
*G06F 17/27* (2006.01)

(52) U.S. Cl. .................. 707/5; 707/6; 707/2; 704/9
(58) Field of Classification Search ............ 707/5, 707/3, 2

See application file for complete search history.

(56) References Cited

U.S. PATENT DOCUMENTS

| 6,341,277 | B1 * | 1/2002 | Coden et al. ............. 707/2 |
| 6,363,373 | B1 * | 3/2002 | Steinkraus ............... 707/3 |
| 6,571,239 | B1 * | 5/2003 | Cole et al. ............... 707/5 |
| 6,665,666 | B1 * | 12/2003 | Brown et al. ............. 707/5 |
| 6,732,094 | B1 * | 5/2004 | Cousins et al. ........... 707/5 |
| 2002/0123994 | A1 * | 9/2002 | Schabes et al. ........... 707/5 |
| 2002/0177991 | A1 * | 11/2002 | Ejerhed .................. 704/2 |

\* cited by examiner

*Primary Examiner*—John Cottingham
*Assistant Examiner*—Kuen S. Lu

(57) ABSTRACT

Methods, software and devices for searching and indexing information are disclosed. Information to be searched is organized as a plurality of responses to queries. A Boolean expression is associated with each response. The Boolean expression for each response is applied to a received query for information. Which of the responses is or are presented is based on the results of the application of the Boolean expressions to the query.

24 Claims, 6 Drawing Sheets

COMPUTERIZED INFORMATION SEARCH AND INDEXING METHOD, SOFTWARE AND DEVICE

FIELD OF THE INVENTION

The present invention relates to the indexing of information, and more particularly to a method, software and device for searching and indexing information using a computer.

BACKGROUND OF THE INVENTION

In recent years, the public Internet has become a tremendous resource for information seekers and information providers. Unfortunately, so much information is available that information seekers often find it exceptionally difficult to find desired information. Information providers, on the other hand, are faced with the challenges of making their information content easily accessible and locatable.

As the internet is distributed, no central authority exists to track and index available information. Nevertheless, many private information indexing and searching tools (often referred to as "search engines") have become available. Some of these rely on administrators to organize indices of available information; others automatically search the internet for information, categorize located content, and index it for searching.

These available search engines provide only limited solace to the information seekers. Still, much information goes un-indexed. More difficult still, most search engines require searchers to formulate an appropriate query, which typically requires some knowledge of a Boolean algebra. The quality of results is governed by the quality of the query. Often, poorly formulated queries yield too many or too few results. Further, the lay operator is typically unable to formulate the ideal query, and is often frustrated by the number of iterations required to locate the desired information.

Privately administered Internet sites often suffer from the same indexing shortcoming as the Internet at large. Many large organizations make tremendous volumes of information available by way of an interconnected Internet server, or an Intranet server. As each of these private information repositories grows in sizes so do the problems with searching, indexing and retrieving information indexing at that site. As a consequence many Internet sites include their own privately administered search engines. As such, once interested site visitors are at the site believed to have the desired information, they can rely on a conventional search engine that searches content only at that site.

This too, however, may be frustrating for site visitors: they have located the site leaving the information of interest, but must still hunt for the information they desire. Again, queries must typically be formed using Boolean terms, and results returned by the search engines may be too numerous or inadequate. Most organizations are attuned to the difficulties in making their information easily available.

Accordingly, there is a need for improved search and indexing methods and software allowing desired information to be easily and unequivocally located.

SUMMARY OF THE INVENTION

In accordance with the present invention, information to be searched is organized as a plurality of responses to queries. A Boolean expression is associated with each response. The Boolean expression for each response is applied to a received query for information. Which of the responses is or are presented is based on the results of the application of the Boolean expressions to the query.

In accordance with an aspect of the present invention there is provided a computer implemented method of providing a response to a user includes associating a Boolean expression with each of a plurality of responses. The Boolean expressions are to be satisfied by an appropriate query for an associated response. The method further includes receiving a query, and for each of the responses, determining if an associated Boolean expression is satisfied by the received query. In response, at least one of the responses is presented.

In accordance with another aspect of the present invention there is provided a computer readable medium, stores computer executable software, that when loaded at a computing device in communication with a stored plurality of responses, and a plurality of Boolean expressions each associated with one of the responses and to be satisfied by an appropriate query for an associated response, adapt the computing device to receive a query for each of the stored responses. The software further determines if an associated stored Boolean expression is satisfied by the received query and in response presents at least one of the responses.

In accordance with a further aspect of the present invention there is provided a computer readable medium storing data, the data comprising a plurality of responses, and at least one Boolean expression associated with each response. Each of the Boolean expression may be satisfied by an appropriate query for an associated response.

In accordance with yet a further aspect of the present invention there is provided a method of organizing information comprising organizing the information into a plurality of responses. For a particular response at least one query is formulated. The particular response is responsive to the query. The method further includes formulating a Boolean expression from the query. This Boolean expression is satisfied by the query. The Boolean expression is stored in association with the particular response.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate by way of example only, embodiments of this invention.

DETAILED DESCRIPTION

Figure 1:
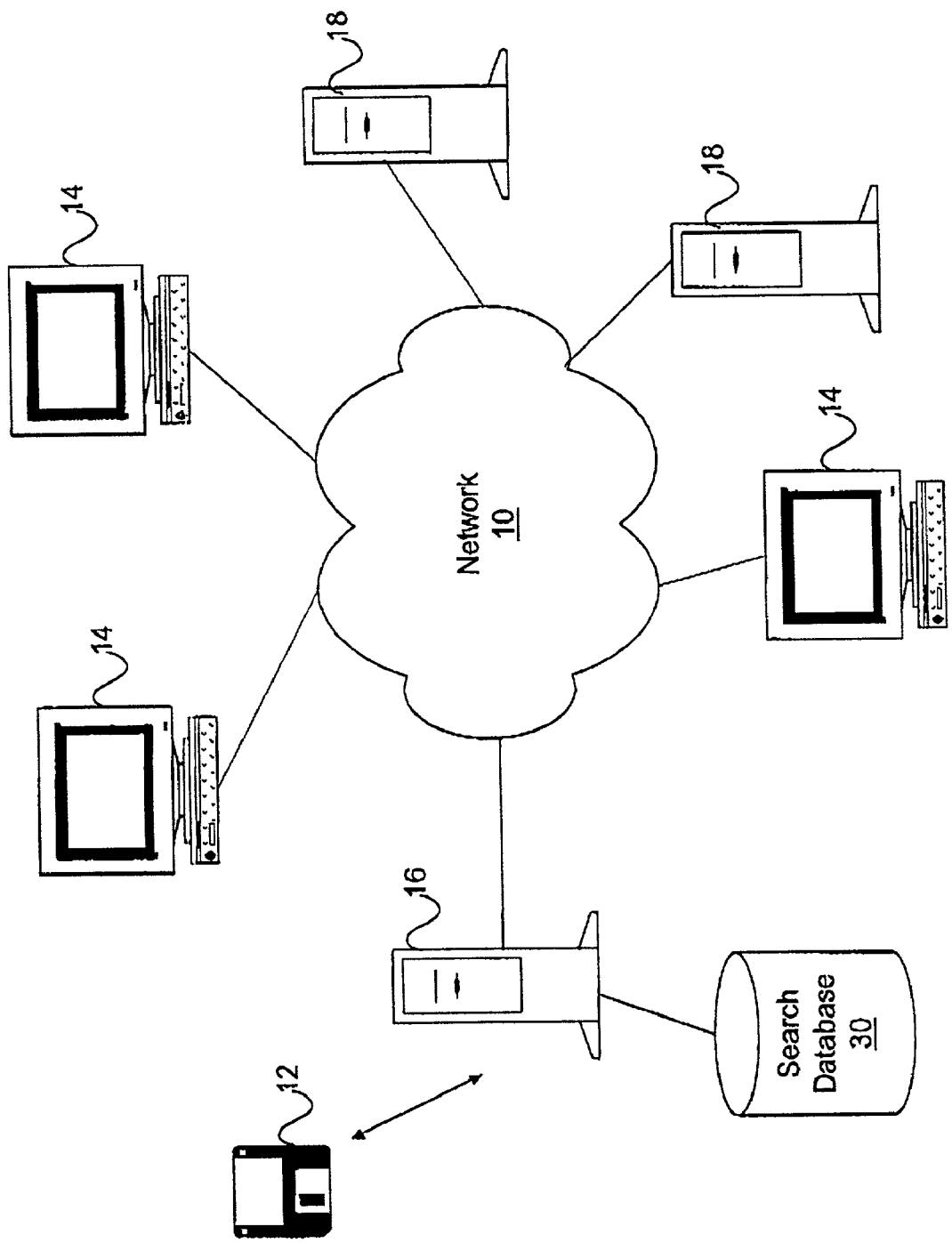
FIG. 1 illustrates a computer network and network interconnected server, operable to index information and provide search results, exemplary of an embodiment of the present invention.

FIG. 1 illustrates a computer network interconnected server 16. Server 16 which may be a conventional network server, is a device exemplary of the present invention including software adapting it to operate in manners exemplary of the present invention. As will become apparent, server 16 includes software capable of maintaining search information and allowing users of server 16 to easily locate information in manners exemplary of the present invention.

As illustrated, server 16 is in communication with a computer network 10 in communication with other computing devices such as end-user computing devices 14 and computer servers 18. Network 10 is preferably the public Internet, but could similarly be a private local area packet switched data network coupled to server 16. So, network 10 could, for example, be an Internet protocol, X.25, IPX compliant or similar network. Example end-user computing devices 14 are illustrated. Servers 18 are also illustrated. As will become apparent, end-user computing devices 14 are conventional network interconnected computers, used to access data from network interconnected servers, such as servers 18 and server 16.

Example server 16 preferably includes a network interface physically connecting server 16 to data network 10, and a processor coupled to conventional computer memory. Example server 16 may further include input and output peripherals such as a keyboard, display and mouse. As well, server 16 may include a peripheral usable to load software exemplary of the present invention into its memory for execution from a software readable medium, such as medium 12.

As such, server 16 includes a conventional filesystem, preferably controlled and administered by the operating system governing overall operation of server 16. This filesystem preferably hosts search data in database 30, and search software exemplary of an embodiment of the present invention, as detailed below. In the illustrated embodiment, server 16 also includes hypertext transfer protocol ("HTTP") files; to provide end-users an interface to search data within database 30. Server 16 stores index information and provides search results to requesting computing devices, such as devices 14.

Figure 2:
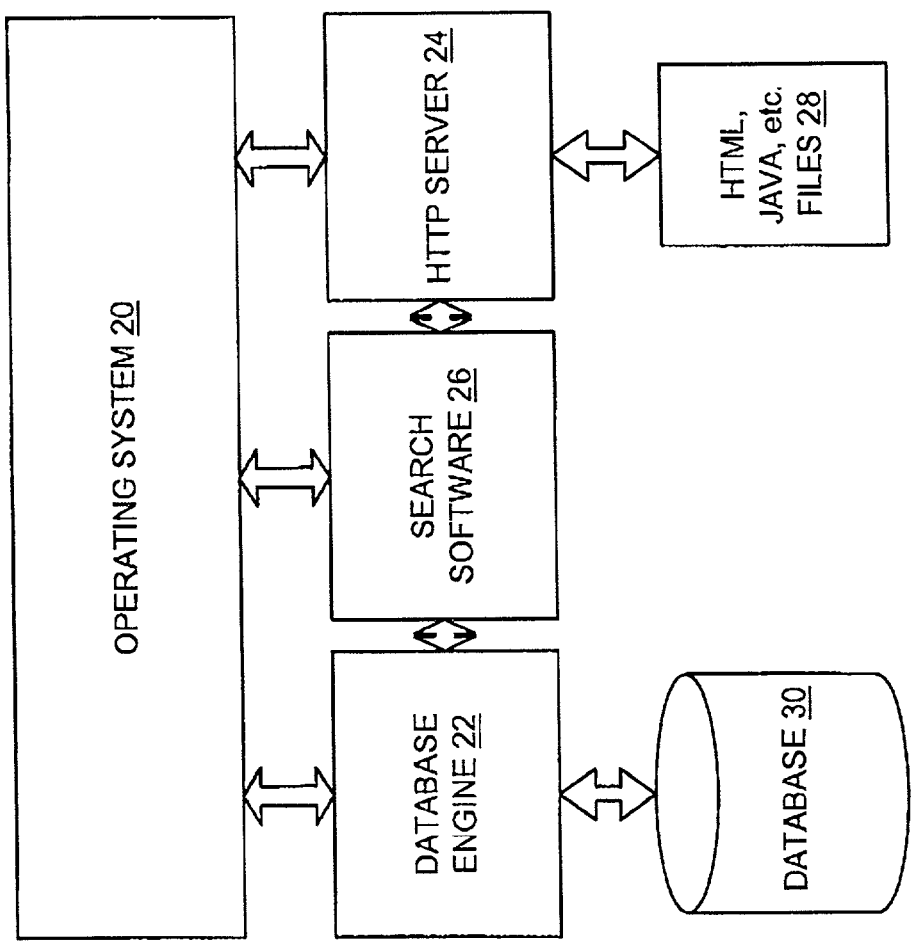
FIG. 2 is a functional block diagram of software stored and executing at the network server of FIG. 1.

FIG. 2 illustrates a functional block diagram of software components preferably implemented at server 16. As will be appreciated, software components embodying such functional blocks may be loaded from medium 12 (FIG. 1) and stored within persistent memory at server 16. As illustrated, software components preferably include operating system software 20; a database engine 22; an http server application 24; and search software 26, exemplary of embodiments of the present invention. Further, database 30 is again illustrated. Again database 30 is preferably stored within memory at server 16. As well data files 28 used by search software 26 and http server application 24 are illustrated.

Operating system software 20 may, for example, be a Linux operating system software; Microsoft NT, 2000, XP operating system software, or the like. Operating system software 20 preferably also includes a TCP/IP stack, allowing communication of server 16 with data network 10. Database engine 22 may be a conventional relational or object oriented database engine, such as Microsoft SQL Server, Oracle, DB2, Sybase, Pervasive or any other database engine known to those of ordinary skill in the art. Database engine 22 thus typically includes an interface for interaction with operating system software 20, and other application software, such as search software 26. Ultimately, database engine 22 is used to add, delete and modify records at database 30. HTTP server application 24 is preferably an Apache, Cold Fusion, Netscape or similar server application, also in communication with operating system software 20 and database engine 22. HTTP server application 24 allows server 16 to act as a conventional http server, and thus provide a plurality of HTTP pages for access by network interconnected computing devices. HTTP pages that make up these home pages may be implemented using one of the conventional web page languages such as hypertext mark-up language ("HTML"), Java, javascript or the like, These pages may be stored within files 28.

Search software 26 adapts server 16, in combination with database engine 22 and operating system software 20, and HTTP server application 24 to function in manners exemplary of embodiments of the present invention. Search software 26 may act as an interface between database engine 22 and HTTP server application 24 and may process requests made by interconnected computing devices. In this way, search software 26 may query, and update entries of database 30 in response to requests received over network 10, in response to interaction with presented web pages. Similarly, search software 26 may process the results of user queries, and present results to database 30, or to users by way of HTTP pages. Search software 26 may for example, be suitable CGI or Perl scripts; Java; Microsoft Visual Basic application, C/C++ applications; or similar applications created in conventional ways by those of ordinary skill in the art.

HTTP pages provided to computing devices 14 in communication with server 16 typically provide users at devices 14 access to a search tool and interface for searching information indexed at database 30. The interface may be stored as HTML or similar data in files 28. Conveniently, information seekers may make selections and provide information by clicking on icons and hyperlinks, and by entering data into information fields of the pages, presented at devices 14. As such, HTTP pages are typically designed and programmed by or on behalf of the operator or administrator of server 16. Conveniently, the HTTP pages may be varied as a server, like server 16, is used by various information or index providers.

Files 28 and search software 26 may further define an administrator interface, not specifically detailed herein. The administrator interface may allow an administrator to populate database 30, and retrieve data representative of user queries, as detailed below. The administrator interface may be accessed through network 10, by an appropriate computing device using an appropriate network address, administrator identifier and password.

The architecture of computing devices 14 (FIG. 1) is not specifically illustrated. Each of devices 14 (FIG. 1), however, may be any suitable network aware computing device in communication with data network 10 and capable of executing a suitable HTML browser or similar interface. Each computing device 14 is typically provided by an end-user and not by the operator of server 16. Computing devices 14 may be conventional desktop computers including a processor, network interface, display, and memory. Computing devices 14 may access server 16 by way of data network 10. As such, each of devices 14 typically stores and execute network aware operating systems including protocol stacks, such as TCP/IP stack, and internet web browsers such as Microsoft Internet Explorer™, Mozilla™, Netscape™, or Opera™ browsers.

As noted, server 16 includes a database 30. Database 30 is preferably a relational database. As will become apparent, database 30 includes records representative of index data. Database 30 may further store information representative of searches requested through server 16.

Figure 3:
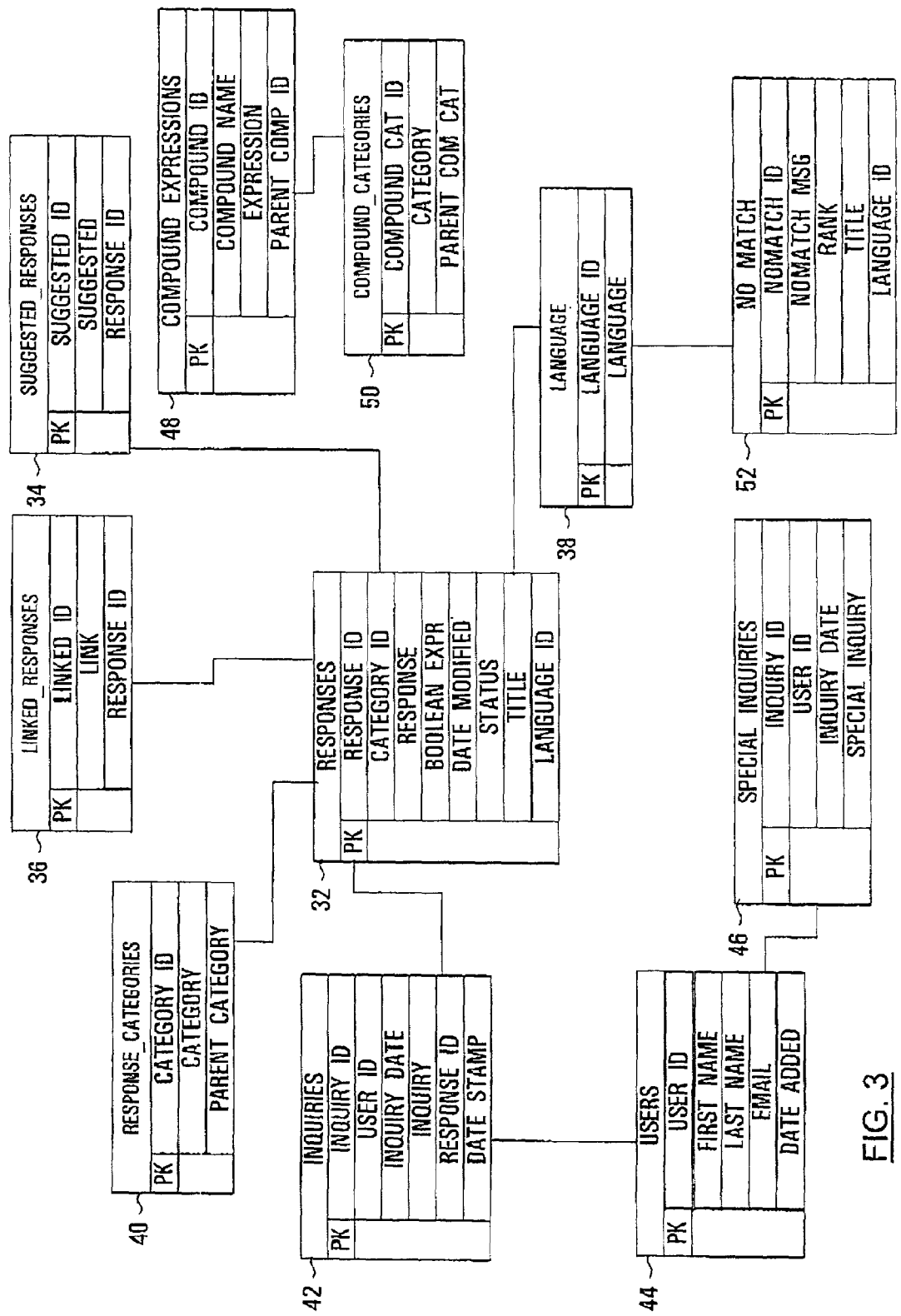
FIG. 3 is a diagram illustrating a database schema for a database used by the network server of FIG. 1.

A simplified example organization of database 30 is illustrated in FIG. 3. As illustrated, example database 30 is organized as a plurality of tables. Specifically, database 30 includes responses table 32 (RESPONSES), suggested responses table 34 (SUGGESTED_RESPONSES); linked responses table 36 (LINKED_RESPONSES); languages table 38 (LANGUAGE); response categories table 40 (RESPONSE_CATEGORIES); inquiries table 42 (INQUIRIES); users table 44 (USERS); special inquiries table 46 (SPECIAL_INQUIRIES); compound expressions table 48 (COMPOUND_EXPRESSIONS); compound categories table 50 (COMPOUND_CATEGORIES); and no match table 52 (NO_MATCH).

As noted, the illustrated structure of database 30 is simplified. Depending on the nature of additional features of server 16, that are not detailed herein, database 30 may include many more tables. Illustrated fields may store text, integers, timestamps, or the like. Similarly, each illustrated table may include many more columns (or fields) than those detailed herein.

As illustrated, responses table 32 (RESPONSES) includes columns (and therefore fields) for storing data representative of a response identifier (RESPONSE_ID-int); response category (CATEGORY_ID-int); response title (TITLE-varchar(50)); a response (or response link) (RESPONSE-varchar(8000)); a boolean expression used to locate the response (BOOLEAN_EXPR-varchar (5000)); a date modified (DATE_MODIFIED-timestamp); language of response (LANGUAGE_ID-int) and a status (STATUS-int). Response table 32 stores responses presented to users of server 16 in response to inquiries to locate specific information.

Each category of response is particularized in table 40. Table 40 includes a numerical identifier of each category (CATEGORY_ID-int); and a text identifier of each category in field (CATEGORY-varchar(250)). Each category entry further includes a field identifying a link to a parent category (PARENT_CATEGORY-int). Table 40 allows an administrator to categorize responses in table 32, and organize (view, sort, etc.) them hierarchically allowing available categories of responses to be presented as a tree.

Suggested response table 34 (SUGGESTED_RESPONSES) includes columns (and therefore fields) for storing data representative of a related response (RESONSE_ID) as contained in table 32; and a suggested response (SUGGESTED_ID) identifying a further response that a user seeking a response in table 32 may be interested in. As such, for each response in table 32, one or more suggested additional responses, believed to be of interest to a seeker of the response in table 32 may be stored.

Linked response table 36 (LINKED_RESPONSES) includes columns (and therefore fields) for storing data representative of responses linked to a particular response identified in response id field (RESONSE_ID-int) contained in table 32; in a linked response field (LINKED_ID-int) identifying a further response that a user seeking a response in table 32 will be presented along with a sought response. Again, for each response indexed in table 32, multiple linked responses may exist in table 36. In this way, multiple responses may be combined and presented in combination.

Table 38 identifies in full text (in field LANGUAGE-varchar(50)) the language of a particular text (as, for example stored in tables 32 and 52), numerically identified in language id field (LANGUAGE_ID-int).

User queries and user identities may optionally be stored within tables 42, 44 and 46.

Specifically, information about known users may be stored in table 44. Fields representing the users first name (FIRSTNAME-varchar(75)); lastname (LASTNAME-varchar(50)); e-mail address (EMAIL-varchar(50)); date added (DATE_ADDED-timestamp).

Inquiries table 42 may store records of inquiries processed by server 16. Each record within inquiries table 42 stores a field identifying the user (USER_ID)-int) of a query; a field identifying the date of the query (INQUIRY_DATE-timestamp); the query (INQUIRY-varchar(1000)); the provided response (RESPONSE_ID-int).

Table 46 stores non-standard inquiries of users. For each non-standard query, an identifier of the query (SP_INQUIRY_ID-int), the user id (USER_ID-int), inquiry date (SP_INQUIRY_DATE-timestamp) and inquiry (SPECIAL_INQUIRY-varchar(4000)) are stored.

Compound expressions table 48 further stores compound Boolean expressions, that may be used in determining matches to inquiries, in manners exemplary of an embodiment of the present invention, as detailed below. Each compound expression is identified numerically (COMPOUND_ID-int); by name (COMPOUND_NAME-varchar(50)) and category (COMPOUND_CAT_ID-int). Expression field (EXPRESSION-varchar(4000)) stores a Boolean expression that is to be equated with the compound expression, when identified by name.

Compound expressions may be placed in categories, which in turn may be identified and linked in table 50 including category id (COMPOUND_CAT_ID-int); text category (COMPOUND_CAT-varchar(250)); and a field identifying the parent compound category (PARENT_COMP_CAT), allowing these to be arranged hierarchically by an administrator.

Figure 4:
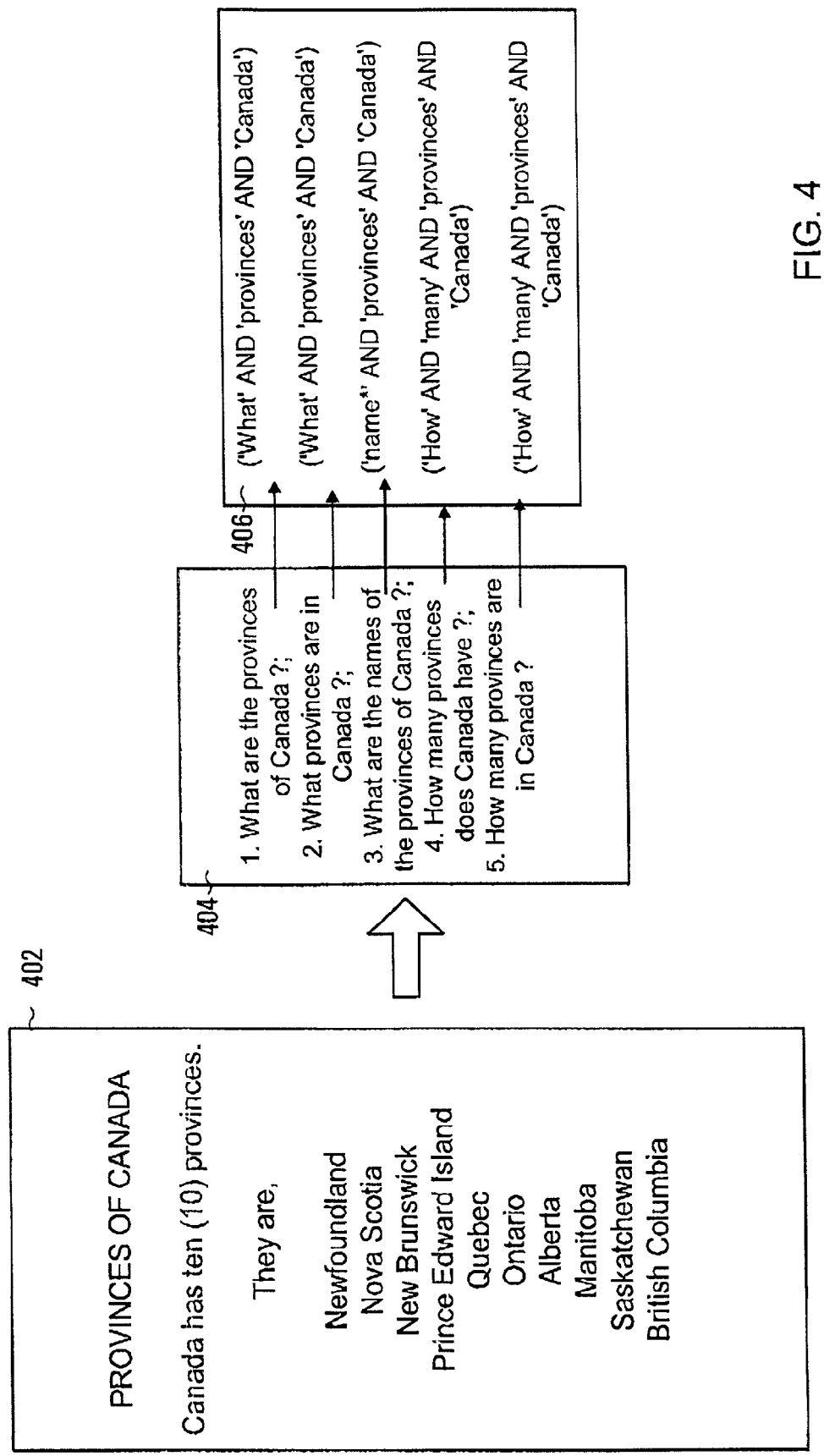
FIG. 4 illustrates an exemplary response, associated contemplated queries and associated Boolean expressions.

To better appreciate use of server 16 and database 30, FIG. 4 illustrates an example response 402 to be indexed for searching by server 16. Specifically, example response 402 may be data in any computer understandable form. For example, response 402 could be text; audio; an image; a multimedia file; an HTML page. Response 402 could alternatively be one or more links to other responses. For example, response 402 could simply be a hypertext link to information available somewhere on network 10, (for example at one of servers 18). Response 402 may be associated with a plurality of queries 404, which are anticipated to be satisfied by response 402. That is, response 402 when presented by a computer in a human understandable form provides a satisfactory answer to a user presenting any one of queries 404.

The queries are preferably plain text queries. For illustration only, illustrated response 402 is a text representation of Canadian provinces, and an introduction to these provinces. Typical queries 404 for which response 402 is satisfactory are also depicted and may include 1. "What are the provinces of Canada?";
2. "What provinces are in Canada?";
3. "What are the names of the provinces of Canada?";
4. "How many provinces does Canada have?"; and
5. "How many provinces are in Canada?.

Queries 404 in turn may be used to form one or more Boolean expressions 406, containing one or more terms satisfied by the queries. The Boolean expressions may be manually formulated by noting the important words/phrases in each query. For example, queries 1.and 2. satisfy the boolean expression ('What' AND 'provinces' AND 'canada') and query 3. satisfies the Boolean expression ('name*' AND 'provinces' AND 'canada'); queries 4 and 5 both satisfies the Boolean expression ('How' AND 'many' AND 'provinces' AND 'Canada'.

So, queries 1, 2, 3, 4, and 5 may be represented by a single, multi-term Boolean expression:

('What' AND 'provinces' AND 'Canada') OR ('What' AND 'provinces' AND 'Canada') OR ('name*' AND 'provinces' AND 'Canada') OR ('How' AND 'many' AND 'provinces' AND 'Canada') OR ('How' AND 'many' AND 'provinces' AND 'Canada').

At the same time, many questions about Canada's provinces, however, are not answered by response 402. For example, queries like 6. "What is the largest province in Canada?"; and
7. "What is the eastern-most province in Canada?";

and the like are not answered by response 402, and are therefore not illustrated among queries 404.

As such, these queries could be explicitly excluded by Boolean expression 406. For reasons that will become apparent, if responses specifically addressing queries 6. and 7. are stored and indexed within table 32, explicit exclusions of the identified Boolean expressions may be unnecessary.

Boolean expression 406, once appropriately formulated is stored within database 30, in the BOOLEAN_EXPR field of table 32 associated storing response 402. The actual response in a computer understandable format is also stored within the associated record in table 32. Queries 404, themselves, need not be, and typically are not, stored. Similar Boolean expressions are developed for other responses indexed by database 30, and stored in table 32. Formulation of a suitable queries and resulting Boolean expressions for each response are typically performed manually. Each record within table 32 stores a response and associated Boolean expression.

Preferably, an administrator also considers which other responses a user seeking a particular (i.e. primary) response within table 32 may be interested in. Suggested response table 34 may be populated by the administrator with identifiers of such other suggested responses. Each other suggested response is identified in table 34 by a suggested response identifier (in the SUGGESTED_ID field), and linked to a primary response in table 32. So for the example response 402, suggested responses may answer queries such as "What are the capitals of the provinces?"; "What are the territories of Canada?", and the like.

Additional responses may also be incorporated by reference in a particular response. Such additional responses may be presented in their entirety along with a sought response in table 32, The additional responses are identified. References to the additional responses are stored in table 34 (in SUGGESTED field), with a reference to a primary response in table 32 (stored in the REPSONSE_ID field).

In the preferred embodiment, database 30 is populated with Boolean expressions representative of natural language queries. As such, the interface provided to the end-user preferably indicates that a natural language query is expected. Of course, Boolean expressions could be formulated for other queries having a syntax other than a natural language could readily be formulated.

Server 16 accordingly is particularly well suited for indexing a single network site, operated by a single operator who is capable of and willing to consider appropriate anticipated queries; Boolean expressions; and related/suggested responses. The operator may further tailor the contents of the web site to logically separate the content of responses, bearing in mind queries to be answered by each response.

Figure 5:
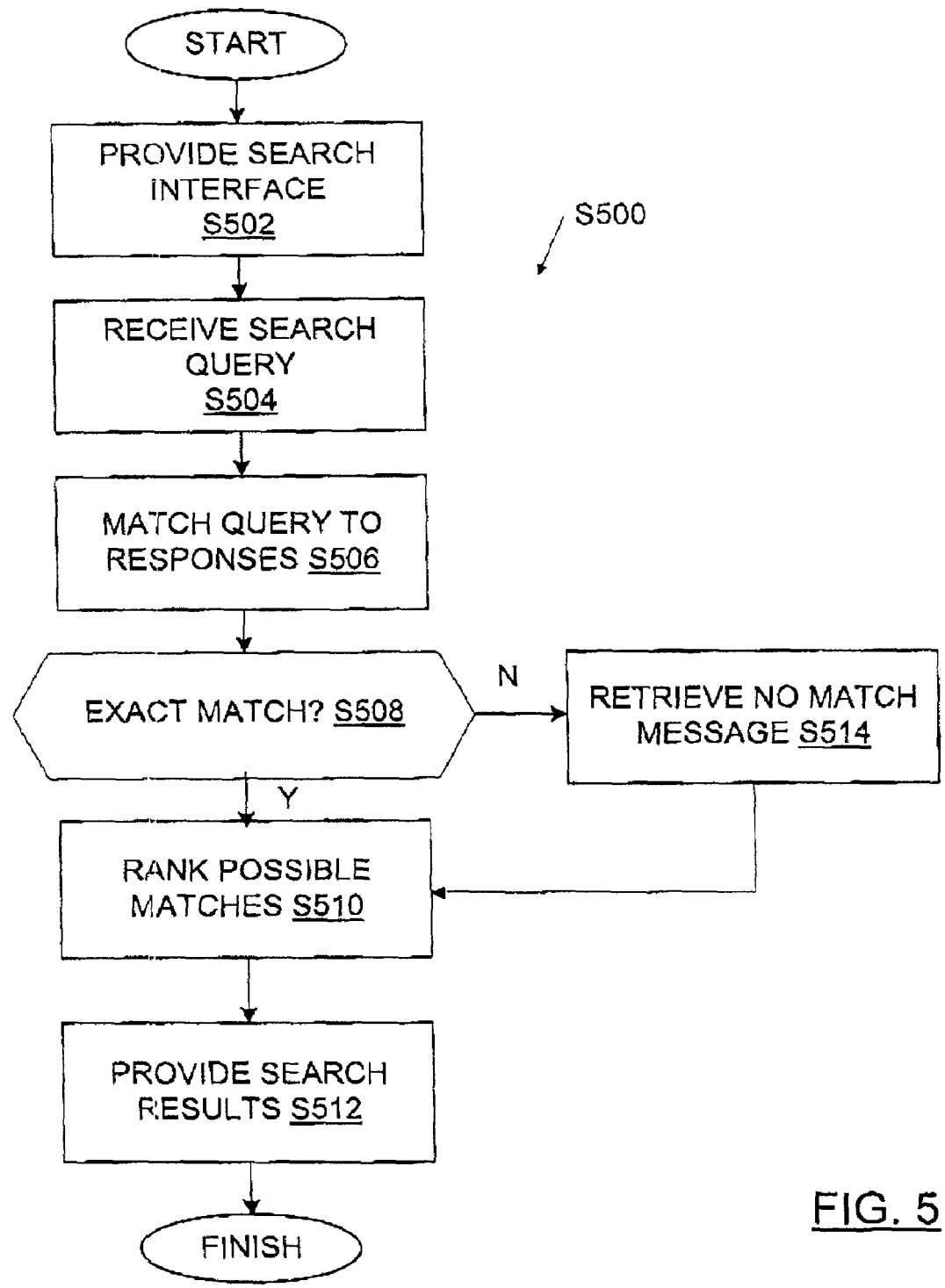
FIGS. 5–6 illustrate exemplary steps performed at the server of FIG. 1.

In operation, a user at a computing device interconnected with network 10 contacts server 16 containing an index of responses and Boolean expressions satisfied by possible queries, formed as detailed above. In response steps S500 and onward illustrated in FIG. 5 are performed at server 16. Optionally, prior to the performance of steps S500 the user's identity may be prompted or retrieved. Specifically, sufficient information used to populate or retrieve a record in table 44 may be obtained from the user. That is, the user could be prompted for a name, a persistent state object ("cookie") could be retrieved from the user's computer, or the like. As will become apparent, knowledge of the user's identity although advantageous, is not required.

In any event once, server 16 is used to allow user queries, server 16 provides a search interface, typically in the form of an HTML page to the contacting computing device 14 in step S502. The HTML page includes a search field. This search field may be populated with a desired query by the user. Preferably, the interface further provides the user with suitable instructions for entering an appropriate query.

Next, a query is received at server 16 in step S504. Optionally, particulars about the query may be logged in inquiries table 42. In response to receiving the query, software 26 parses words within the query and applies Boolean expressions stored within the BOOLEAN_EXPR field of table 32 for all (or selected) responses stored in table 32. In parsing, extra spaces and punctuation in the query are preferably removed/ignored. Unlike typical search techniques, submitted queries are not used to form Boolean expressions used to search responses. Instead, stored Boolean expressions for indexed responses are applied against submitted queries.

Figure 6:
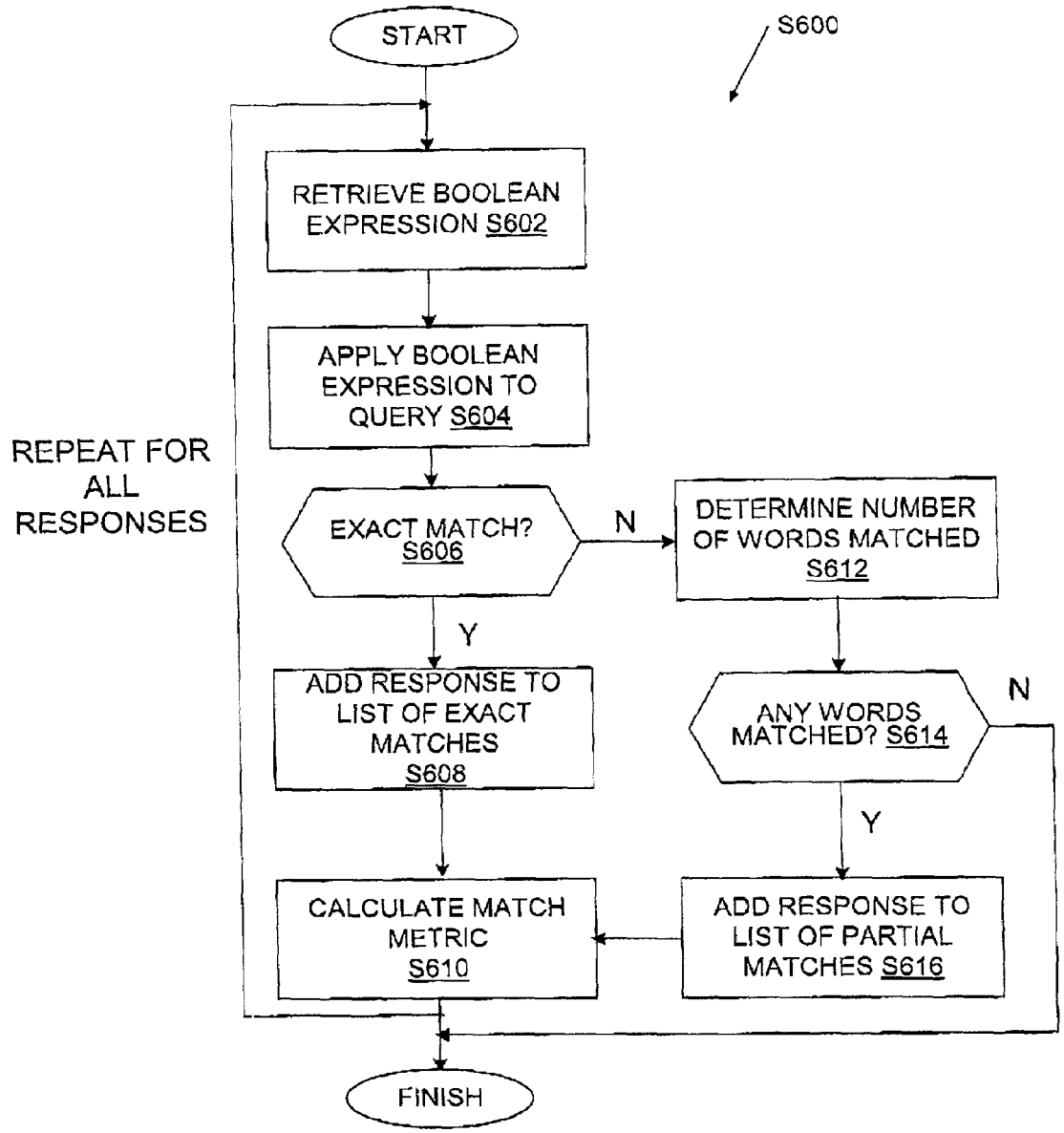

So, for each Boolean expression in table 32, steps S600 of FIG. 6 are performed in step S506. That is, in step S602 the Boolean expression stored in each BOOLEAN_EXPR field of table 32 is applied to the received query, and is evaluated. In the example embodiment, each term of a stored Boolean expression is separately by a Boolean operator and separately evaluated. Strings are encased with single quotes, and matched without regard to case. Logical operators AND, OR, NOT, XOR and the like may separate terms and may be interpreted. Similarly, common wild cards such as "*", "?" and the like may be used as part of the expressions. Common Boolean terms may be represented as single terms. Compound terms forming part of a Boolean expression may be identified with a special character such as square brackets. Compound terms are defined in tables 50 and 52 and separately evaluated as detailed below.

As will be appreciated, many Boolean expressions are equivalent.

So for example, the above noted expression
('What' AND 'provinces' AND 'Canada') OR ('What' AND 'provinces' AND 'Canada') OR ('name*' AND 'provinces' AND 'Canada') OR ('How' AND 'many' AND 'provinces' AND 'Canada') OR ('How' AND 'many' AND 'provinces' AND 'Canada').
is equivalent to the Boolean expression:
('provinces' AND 'Canada') AND ('what' OR ('how' AND 'many') OR 'name')

In applying a stored Boolean expression, server 16 under control of software 26 first reduces the Boolean expression to a canonical form, having multiple unique terms ORed together. That is, any Boolean expression is reduced to a format
(sub-expression1) OR (sub-expression2) OR (sub-expression3) OR (sub-expresion 4) . . .

In this format, the Boolean expression will be satisfied if any one of the multiple sub-expressions is satisfied. Each of the ORed sub-expressions, in turn includes a single term or multiple terms that are ANDed together. Each term could, of course be a NOT term. In this way any Boolean expression may be canonically represented.

Conveniently, in this canonical format, a degree of match for each sub-expression, and for the entire Boolean expression may easily be calculated in a number of ways.

For example, as each sub-expression (i.e. sub-expression1, sub-expression 2 . . . ) includes only terms that are ANDed together, it is possible to calculate a degree of match for each sub-expression, as the ratio of the total number of terms in the sub-expression that are satisfied by the query, to the total number of terms of the sub-expression in the query. Thus the degree of match for any matched sub-expression would be one (1).

So for example, if sub-expression1=(A AND B AND C), a first query including words A, B and C would satisfy sub-expression1. A second query including only words A and B would not satisfy sub-expression1. A degree of match equal to 2/3 could be calculated for sub-expression1as applied to this second query.

At the same time, in the event a sub-expression is satisfied by the query, a quality of match for that sub-expression may be calculated. Again, a quality of match may be calculated in any number of ways. For example, the quality of match may be calculated as the ratio of the number of terms in a sub-expression, divided by the total number of words in the query. So a five (5) word query including the words A, B, and C, would satisfy sub-expression1 and a quality of match equal to 3/5 could be calculated.

So, in the event a Boolean expression is satisfied by the words of the submitted query, as determined in step S606, an identifier for the response associated with the satisfied Boolean expression is maintained in step S608. As well, one or more metrics identifying the quality of the match may be calculated in step S610.

Numerous other ways of determining metric(s) indicative of a degree of match will be appreciated by those of ordinary skill in the art.

This metric(s) may be calculated in any number of ways. As noted the quality of match for the Boolean expression may be calculated, by calculating the quality of match for any of the matched sub-expression of the Boolean expression, and choosing the largest of these as calculated. For the example Boolean expressions 404 (FIG. 4), question 1. "How many provinces are in Canada", would produce an exact match and a quality of match score of 4/6, calculated as above. A question of "How many provinces in Canada are east of Saskatchewan" would yield an exact match with a quality of match word score of 4/9. The largest of these calculated word scores may be considered the quality of match metric for the Boolean expression as applied to the particular query.

Optionally, additional metrics indicative of the quality of match may be calculated. For example, a further "relevant" word score, may be calculated by calculating a quality of match once common (or "irrelevant") words stored in a common word dictionary (not specifically illustrated) are excluded. For example words like "the", "in", "an", etc. in the query may be excluded. The dictionary of irrelevant words may be manually formed depending on the responses stored within table 34. Other metrics indicative of the quality of match could be calculated in any number of ways. For example, each term in a Boolean expression could be associated with a numerical weight; proximity of matched words in the query could be taken into account. Other ways of calculating a metric indicative of a quality of match may be readily appreciated by those of ordinary skill in the art.

In the event a Boolean expression does not result in an exact match, as determined in step S606, the number of matched words within the Boolean expression may be determined in step S612. If at least one word is matched to a term in any sub-expression, as determined in step S614, the response may be noted as a partially matched response in a list of partially matched responses in step S616. A metric indicative of the degree of match may be calculated for the Boolean expression in step S610. For example, a degree of match, as detailed above, may be calculated for each sub-expression of the Boolean expression. The largest of these may be stored as the degree of match for the query. Thus, an identifier of the partially satisfied response and the ratio of matched terms to total terms may also be stored in step S616. Steps S602 and onward are repeated for each response within database 30.

Once all exactly and partially matched responses are determined in step S506 (i.e. steps S600), the best exact match, if any (as determined in step S508) is determined in step S510. The best exact match may be the exact match determined in steps S600 having the highest metric [e.g. word count and/or relevant word count, etc.]. In step S510, other exact response may be ranked. Similarly, partial matches may be ranked using the calculated degree of match metric. In step S512, the best exactly matched response is obtained from the RESPONSE field of table 34 and presented. As well, any linked responses (i.e. data in the RESPONSE field) as identified in table 36 are also presented. Preferably, the best matched exact response is unique. If it is not, all exact matches with equal degrees of matches may be displayed. As well as titles (or links) of stored associated and suggested responses stored in tables 34 and 36 are presented. These may, for example, be presented in a drop down box, or the like. Similarly, if server 16 indexes other types of data in table 32, (e.g. sound, images, etc.), the data associated with the best matched response may be presented in human understandable form. Preferably, not all partially matched responses will be presented. Instead only a defined number of responses or responses whose other metrics exceed defined scores need be presented. Title of these may also be presented in a drop-down box.

Results, including the highest ranked exact response, possible alternate responses, and responses associated with the highest ranked response are preferably presented to a computing device of the querying user in step S510. Results may be presented as an HTML page, or the like.

In the event no exact match is found, as determined in step S508, a message as stored in NO_MATCH table 52 indicating that no exact match has been found is retrieved in step S514. Partial matches, if any, are still sorted in step S510. A result indicating no exact match and a list of partial matches is presented in step S512.

Optionally, in the event no exact match is determined, the user may be prompted to rephrase his query or submit this query as a special query for manual processing. This may be accomplished by presenting the user with an HTML form requesting submission of the query as a special query for later handling by the administrators of server 16. If the user chooses to do so, the query for which no exact match is obtained may be stored in table 54. At a later time, an administrator of server 16 may analyze the query, and if desirable update responses and/or Boolean queries stored in table 32 to address the special query. If a userid is associated with the special query, a conventional reply e-mail addressing the special query may be sent to user.

After a single query is processed, steps S500 and onward may be repeated and additional queries may be processed.

As server 16 is used and queries and special queries are logged, the contents of database 30 may be updated. Such updates may include adding new responses and refining Boolean expressions for existing responses.

As should now be appreciated, use of one or more match metrics may significantly reduce the complexity of stored Boolean expressions. Stored expressions need not exclude multiple contemplated incorrect queries, For example, if in addition to response 402, table 32 further stored a response indicative of the number of provinces in Canada east of Saskatchewan, the question "What is the eastern-most province in Canada?", would likely yield higher match metric(s) [e.g. degree of match or quality of match] for this response, than for example response 402. As such, specific exclusions of contemplated queries for which other responses are stored may not be necessary, as software 28 should present the best response for a particular query.

In processing Boolean expressions in step S604, pre-defined compound Boolean expressions stored in tables 48 and 50 may be used. Compound Boolean expressions typically include several Boolean terms, and are identified with a single moniker. Compound Boolean expressions may reduce the size of the stored Boolean expressions, and simplify formulation of Boolean expressions. For example, queries involving price or cost may include numerous synonymous terms, such as "dollar", "price", "cost", and the like. A composite Boolean expression ("dollar" OR "price" OR "cost" OR "money") may be stored within the EXPRESSION field of compound expression table 48. The compound expression may be identified by a name stored in the associated NAME field in table 48. For example, the name "PRICE" (or any other name) unique to table 48 may be attributed to the compound expression. In evaluating expressions in steps S600 (FIG. 6), compound expressions may be identified using a particular identifier. For example, square brackets may identify a compound expression. As Boolean expressions in table 32 are parsed, compound Boolean expressions are resolved with reference to compound expression table 48. Conveniently, the meaning of compound expressions may be loaded into memory, and need not be retrieved from database 30 with every use. Compound expressions may be replaced prior to considering a stored Boolean expression in canonical form, as detailed above.

As well, optionally for any one query, not all responses (and associated Boolean expressions) need be applied in steps S600. Instead, for example, only Boolean expressions for responses in a specific category or categories (as stored in the CATEGORY_ID field of a response record in table 32) need be tested. So, for example, if server 16 were used to process queries about an intranet site, categories of responses for any particular query might be limited depending on how the particular query was submitted. As a further example, in the event server 16 hosted a general site, having many topics, responses against which a particular query is tested, could be limited to a particular topic derived from the HTML page that the user is viewing when the query is initiated. Optionally, a further table may be stored in database 30 and contain a relation between categories stored in the CATEGORY_ID field of records in table 32, and categories relevant to searches originating with a particular page. That is, categories stored in tables 32 and 40 may be organized to facilitate creation of content. Accordingly, a table storing a correlation between tables 32 and 40 and categories that should be tested for any particular query may be stored.

As will be appreciated, while the organization of hardware, software and data have been explicitly illustrated, a person skilled in the art will appreciate that the invention may be embodied in a large number of ways. For example, software could be formed using any number of languages, components and the like. The interface need not be provided in HTML. Instead the interface could be provided using Java, XML, or the like. Database 30 could be replaced with an object oriented structure, Queries need not be processed over a network, but could be processed at a single, suitably adapted, machine.

Of course, the above described embodiments, are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A computer implemented method of providing a response to a user comprising:
   storing a plurality of possible responses;
   storing a plurality of Boolean expressions, one of said plurality of Boolean expressions associated with each of said plurality of possible responses, each of said plurality of Boolean expressions identifying at least one condition to be satisfied by a text query, to which its associated one of said plurality of responses is to be provided;
   receiving a text query;
   for each of said plurality of possible responses, applying its associated Boolean expression to said received text query thereby determining if the associated Boolean expression is satisfied by said text query;
   presenting at least one of said plurality of possible responses, in response to said determining.

2. The method of claim 1, wherein said presenting comprises presenting at least one of said plurality of possible responses having its associated Boolean expression satisfied by said received text query.

3. The method of claim 2, wherein said plurality of possible responses each comprise information at least partially responsive to said text query.

4. The method of claim 1, wherein each of said plurality of Boolean expressions comprises an expression to match a plurality of words within said text query.

5. The method of claim 4, wherein said plurality of possible responses and said plurality of Boolean expressions are stored in a database.

6. The method of claim 2, wherein said determining further comprises calculating quality of match metrics for satisfied ones of said plurality of Boolean expressions, each of said quality of match metrics providing an indicator of a quality of match of a satisfied Boolean expression to said text query.

7. The method of claim 6, wherein each of said plurality of Boolean expressions may be expressed as a plurality of logically ORed sub-expressions, and one of said plurality of Boolean expressions is satisfied if one of its sub-expressions is satisfied and wherein said quality of match metrics are calculated by calculating an indicator of a quality of match for sub-expressions satisfied by said text query.

8. The method of claim 6, wherein said presenting is based on said quality of match metrics.

9. The method of claim 2, further comprising calculating degree of match metrics for un-satisfied ones of said plurality of Boolean expressions, each of said degree of match metrics providing an indicator of a degree of match of an un-satisfied one of said plurality of Boolean expression to said received text query.

10. The method of claim 9, wherein each of said plurality of Boolean expressions may be expressed as a plurality of ORed sub-expression, and one of said plurality of Boolean expressions is satisfied if one of its sub-expression is satisfied, and wherein said degree of match metrics are calculated by calculating an indicator of a degree of match for sub-expressions not satisfied by said received text query.

11. The method of claim 10, wherein each of said sub-expressions comprises a plurality of logically ANDed terms and each of said degree of match metrics is calculated by determining a number of terms in any sub-expression satisfied by said received text query.

12. The method of claim 1, further comprising presenting a plurality of additional responses associated with said at least one of said plurality of responses.

13. The method of claim 1, wherein said at least one of said plurality of responses comprises a link to additional information available by way of a computer network in communication with said computer.

14. The method of claim 1, where at least some of said plurality of Boolean expressions comprise an identifier of a compound Boolean expression, to be resolved into a plurality of Boolean terms during said determining.

15. Computer readable storage medium, storing computer executable software, that when loaded at a computing device in communication with a stored plurality of responses, and a plurality of Boolean expression each associated with one of said responses and to be satisfied by an appropriate query for an associated response, adapt said computing device to:
store a plurality of possible responses;
store a plurality of Boolean expressions, one of said plurality of Boolean expressions associated with each of said plurality of possible responses, each of said plurality Boolean expressions identifying at least one condition to be satisfied by a text query, to which its associated one of said plurality of responses is to be provided;
receive a text query;
for each of said plurality of possible responses, apply its associated Boolean expression to said received text query to determine if the associated Boolean expression is satisfied by said received text query; and
present at least one of said plurality of possible responses, in response to said determining.

16. A method of organizing information comprising:
organizing said information into a plurality of responses;
for a particular one of said responses formulating at least one natural language query to search for said particular one of said responses;
formulating a Boolean expression from said at least one query, said Boolean expression satisfied by said at least one query;
storing on a computer readable storage medium said Boolean expression in association with said particular one of said responses, so that said Boolean expression may later be applied to text representing said query to retrieve said particular one of said responses.

17. The method of claim 16, further comprising repeating said formulating at least one natural language query; said formulating a Boolean expression; and said storing, for each of said plurality of responses.

18. A computer implemented method of presenting at least one answer to a natural language query to a user, said method comprising:
store a plurality of possible answers;
storing a plurality of Boolean expressions to be applied to text including a plurality of words, one of said plurality of Boolean expressions associated
with each of said plurality of possible answers;
receiving text representing said natural language query from said user;
applying each of said Boolean expressions to said text to assess which of said Boolean expressions are satisfied by said text;
providing at least some of said plurality of possible answers associated with said satisfied Boolean expressions.

19. The method of claim 18, wherein each of said Boolean expressions is formed from anticipated natural language queries for an associated answer.

20. The method of claim 19, wherein said providing comprises presenting all those of said plurality of answers having their associated Boolean expression satisfied by said natural language query.

21. The method of claim 19, wherein each of said plurality of Boolean expressions comprises an expression to match a plurality of words within said natural language query.

22. The method of claim 21, wherein said plurality of possible answers, said plurality of Boolean expressions and their associations are stored within a database.

23. The method of claim 18, wherein some of said plurality of possible answers associated with said satisfied Boolean expressions contain a link to additional information available by way of a computer network in communication with said computer.

24. A computer implemented method of organizing information comprising:
organizing said information into a plurality of answers to possible queries;
for a particular one of said answers postulating at least one natural language query, to which said particular one of said answers is responsive;
formulating a Boolean expression from said at least one natural language query, said Boolean expression satisfied by said at least one query;
storing said Boolean expression in association with said particular one of said answers, so that said Boolean expression may later be applied to text representing said query to retrieve said particular one of said answers.

* * * * *